(12) United States Patent
Reinhart et al.

(10) Patent No.: US 8,720,491 B1
(45) Date of Patent: May 13, 2014

(54) TUBE LINER

(75) Inventors: Pat Reinhart, Gibbon, MN (US);
Richard Mix, Monticello, GA (US);
Rick Pupkiewcz, Hudson, FL (US);
Jimmy Rabitsch, Covington, GA (US)

(73) Assignee: Poly Tech Industries, Inc., Monticello, GA (US)

(*) Notice: Subject to any disclaimer, the term of this patent is extended or adjusted under 35 U.S.C. 154(b) by 860 days.

(21) Appl. No.: 12/939,717

(22) Filed: Nov. 4, 2010

(51) Int. Cl.
*F16L 55/16* (2006.01)

(52) U.S. Cl.
USPC ............ 138/98; 138/97; 138/156; 138/162; 138/158

(58) Field of Classification Search
USPC .......... 138/98, 97, 96 R, 96 T, 156–158, 114
See application file for complete search history.

(56) References Cited

U.S. PATENT DOCUMENTS

| | | | | | |
|---|---|---|---|---|---|
| 2,143,480 | A | * | 1/1939 | Gunderman | 138/96 T |
| 2,156,221 | A | * | 4/1939 | Kahn et al. | 138/96 T |
| 3,720,241 | A | * | 3/1973 | Bryant et al. | 141/25 |
| 4,630,646 | A | * | 12/1986 | Koehle | 138/96 R |
| 6,095,197 | A | * | 8/2000 | Kane | 138/96 R |

* cited by examiner

*Primary Examiner* — Patrick F Brinson
(74) *Attorney, Agent, or Firm* — Smith Gambrell & Russell LLP (57) ABSTRACT

A tube liner for repairing a damaged or worn out auger tube or pneumatic conveyor tube. The tube liner includes an elongated liner body with a longitudinally extending gap and expandable seam assembly positioned in the gap. Once the liner is inserted into the auger tube or pneumatic conveyor tube, the expandable seam forces the liner against the inside wall of the auger tube or pneumatic conveyor tube to provide a tight seal.

10 Claims, 8 Drawing Sheets

Fig_7

Fig_8

TUBE LINER

FIELD OF THE INVENTION

This invention relates to a liner for repairing a tube and more particularly to a liner for repairing the tube of an auger or a pneumatic conveyor.

BACKGROUND OF THE INVENTION

Augers and pneumatic conveyors are used in a variety of circumstances to move granular material from one location to another. Among other uses, augers and pneumatic conveyors are used to move grain from one location to another. Virtually every farmer has equipment that contains augers including for example combines, grain carts, and swing away augers. Similarly, pneumatic conveyors are used in peanut harvesters to convey peanuts from one location to another. As a result of continuing use, the tubes of the augers and of the pneumatic conveyors wear out from the friction of the granular material within the tubes, and the tubes require repair or replacement.

Figure 1:
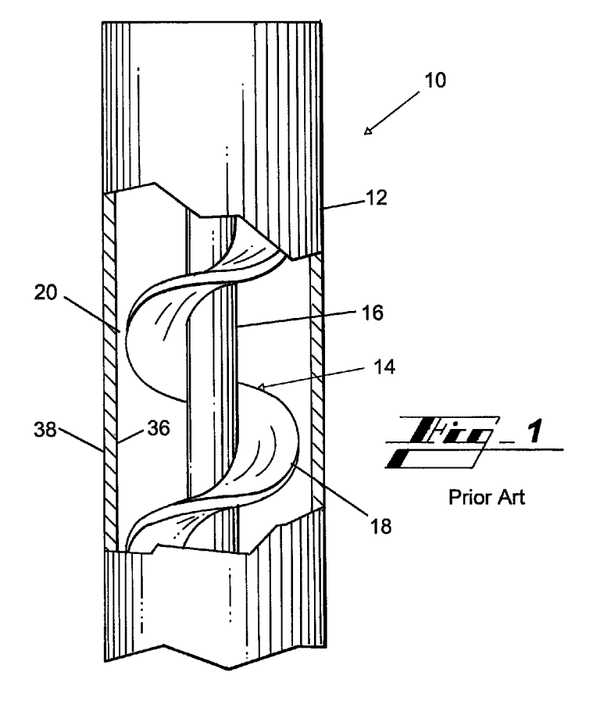
FIG. 1 is a front elevation view of a conventional auger with cutaway detail.
Figure 2:
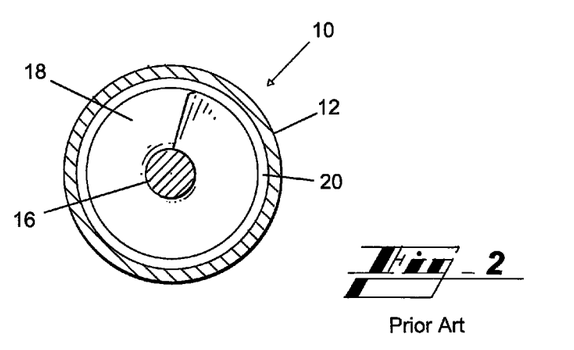
FIG. 2 is an end view of the conventional auger.
Figures 3, 4:
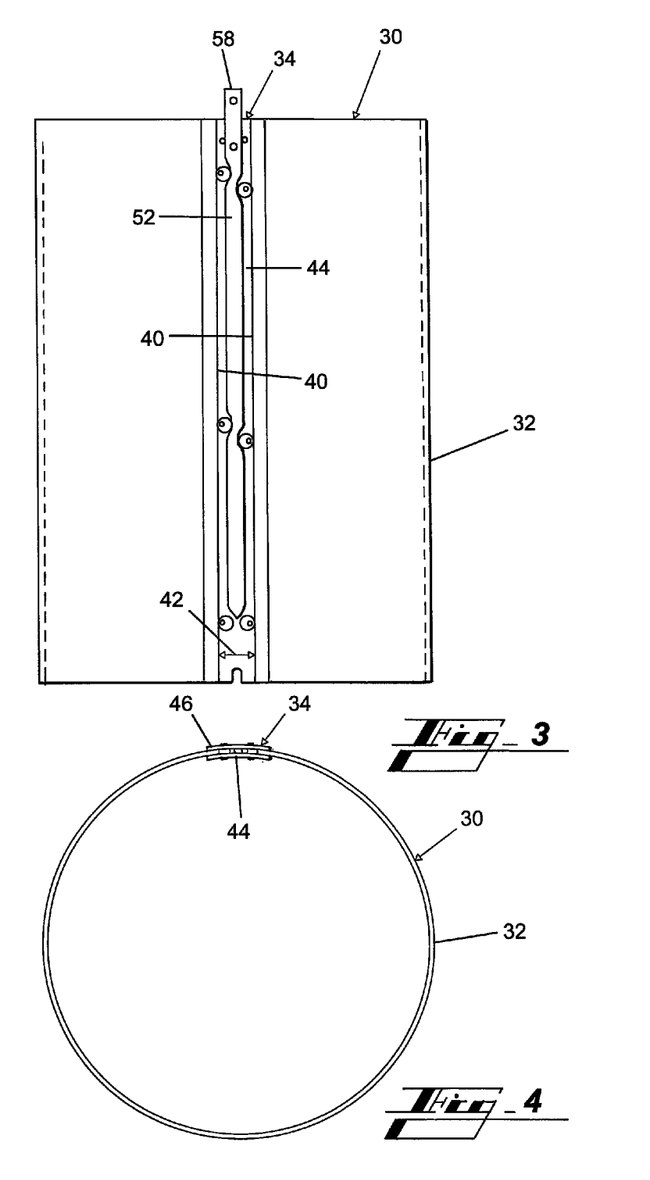
FIG. 3 is a front elevation view of an auger liner in accordance with the present invention showing the liner seam assembly of the auger in its load configuration with the outside plate removed for clarity.
FIG. 4 is an end view of the auger liner in accordance with the present invention showing the liner seam assembly of the auger liner in its load configuration.
Figures 5, 6:
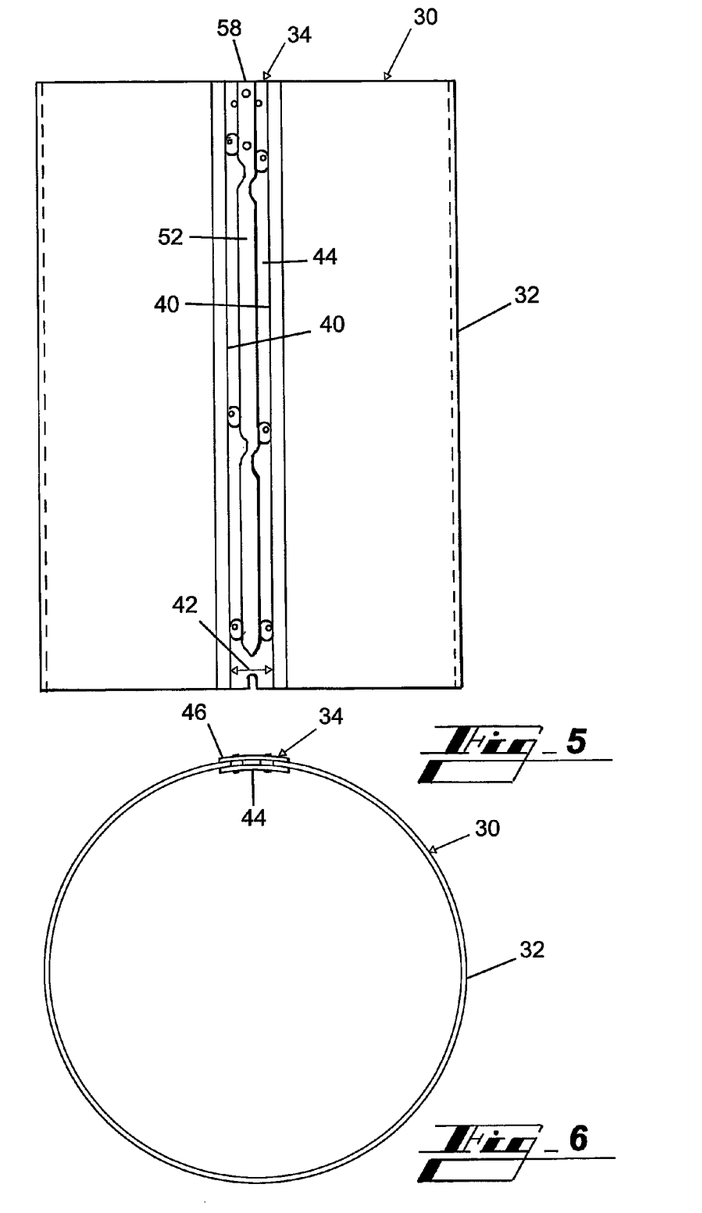
FIG. 5 is a front elevation view of the auger liner in accordance with the present invention showing the liner seam assembly of the auger in its final configuration with the outside plate removed for clarity.
FIG. 6 is an end view of the auger liner in accordance with the present invention showing the liner seam assembly of the auger liner in its final configuration.

A conventional grain auger 10 is shown in FIGS. 1 and 2. Such a conventional grain auger 10 comprises a steel auger tube 12, with an inside wall 36 and an outside wall 38, and an auger screw 14 fitted for rotation within the auger tube 12. The auger screw 14 comprises an auger shaft 16 surrounded by auger flights 18. The auger flights 18 have an outside diameter that is less than the inside diameter of the auger tube 12. Consequently, a clearance 20 exists between the inside wall 36 of the auger tube 12 and the outside diameter of the auger flights 18.

When the auger tube 12 wears out, replacement of the auger tube 12, which is a complex welded assembly, can be very expensive. One solution to the problem of a worn-out auger tube 12 is to repair the conventional auger 10 by inserting a liner into the clearance 20 of the auger 10 between the inside wall 36 of the auger tube 12 and the outside diameter of the auger flights 18. Such a conventional auger liner is typically an ultra high molecular weight polyethylene (UHMW polyethylene). The cost of using an UHMW polyethylene auger liner is significantly less than replacing or repairing the steel auger tube 12, and the UHMW polyethylene auger liner will outlast the steel auger tube by some appreciable margin.

A conventional UHMW polyethylene auger liner comprises a cylindrical auger liner body having a gap and a separate steel seam. In order to install such a conventional UHMW polyethylene auger liner, the auger screw must first be removed from the auger tube. With the auger screw removed, the auger liner body with its gap is inserted into the auger tube in the clearance between the outside diameter of the auger flights and the inside wall of the auger tube. Once the auger liner body is in place, the steel seam is inserted into the gap in the auger liner body to force the auger liner body against the inside wall of the auger tube. If, after the steel seam has been inserted, the auger liner needs to be tighter at the top or bottom of the auger liner, one or more metal shims must be inserted into one or all of four locations (two at the top of the steel seam and two at the bottom of the steel seam). The need to shim the space around the steel seam results in limiting the length of the auger liner that can be installed and also requires access to both ends of the auger tube. Once the conventional auger liner is in place, the steel seam is bolted to the auger tube to hold auger liner in place. Again, the need to bolt the steel seam to the auger tube requires access to the entire length of the auger tube with the auger screw removed. The same prior art method may be used to repair the tube of a pneumatic conveyor.

SUMMARY OF THE INVENTION

In order to overcome the drawbacks of the prior art, an auger liner or a pneumatic conveyor liner in accordance with the present invention comprises a UHMW polyethylene cylindrical auger liner body, cut to the proper dimensions to fit tightly inside the auger tube or the pneumatic conveyor to, and a stainless steel seam assembly attached to the liner body. When in its final position, the seam assembly forces the cylindrical liner body tightly against the inside wall of the auger for pneumatic conveyor tube and thereby seals the liner to the inside wall of the tube. Without a proper seal between the cylindrical liner body and the inside wall of the tube, the granular material being moved by the auger screw or the pneumatic pressure could lodge between the inside wall of the tube and liner rendering the auger or the pneumatic conveyor inoperable.

The liner body is cylindrical in shape with a gap running the length of the liner body. The gap is defined by two longitudinal edges of the liner body on each side of the gap. The seam assembly is positioned adjacent to the longitudinal edges of the liner body and thereby fills the gap between the longitudinal edges of the liner body. The seam assembly of the auger or pneumatic conveyor liner comprises an inside plate and outside plate spaced apart by standoffs. Pairs of standoffs are spaced apart transversely, and the pairs of standoffs are located along the length of the seam assembly. A crush washer is located at each standoff and occupies the space between the inside plate and the outside plate.

An expansion bar extends along the length of the seam assembly and is positioned between the standoffs. The expansion bar has a series of precision machined notches that align with each pair of standoff and crush washers when the expansion bar is positioned between the standoffs in a first loading position. In the loading position, a drive portion of the expansion bar extends beyond the end of the liner. Once the liner is inserted through one end of the auger tube or the pneumatic conveyor, the drive portion of the expansion bar is driven into the seam assembly until the drive portion of the expansion bar is flush with the top of the seam assembly.

As the expansion bar is driven into the seam assembly, the sides (cam surfaces) of the notches in the expansion bar engage the series of crush washers which in turn engage the longitudinal edges of the liner body. The camming action of the sides of the notches forces the crush washers outwardly against the longitudinal edges of the liner body thereby forcing the liner body into tight engagement with the inside wall of the auger tube or the pneumatic conveyor tube. The level of resistance needed to seal the liner body against the inside wall of the auger tube or pneumatic conveyor tube will independently crush each of the crush washers thereby accommodating any variations in the inside diameter over the length of auger tube or the pneumatic conveyor tube.

Because the seam assembly is self-contained within the gap of the liner body and is inserted into the auger tube on the pneumatic conveyor tube simultaneously with the liner body, the installation can be accomplished through only one open end of the auger tube or the pneumatic conveyor tube. Moreover, the liner of the present invention can be installed without removing the auger screw inside the auger tube.

Further objects, features and advantages will become apparent upon consideration of the following detailed description of the invention when taken in conjunction with the drawings and the appended claims.

DETAILED DESCRIPTION OF THE PREFERRED EMBODIMENT

Figure 7:
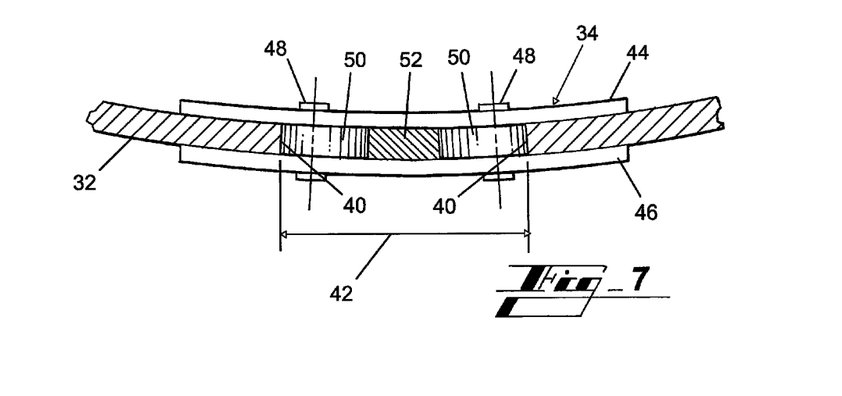
FIG. 7 is a detailed end view of the seam assembly of the auger liner in accordance with the present invention showing the seam assembly of the auger liner in its load configuration.
Figure 8:
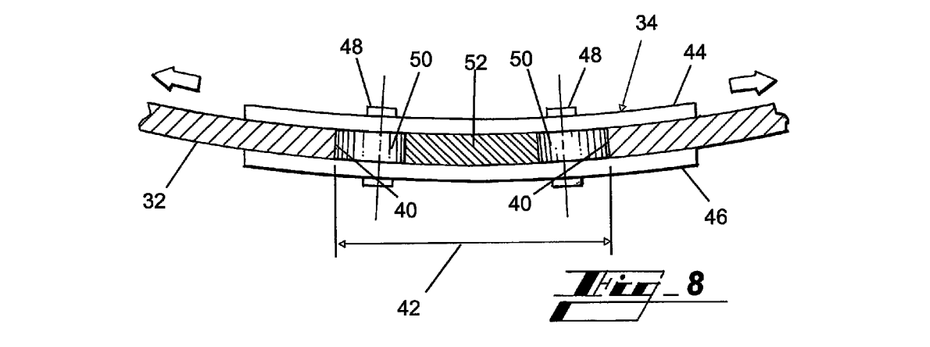
FIG. 8 is a detailed end view of the seam assembly of the auger liner in accordance with the present invention showing the seam assembly of the auger liner in its final configuration.

Turning to FIGS. 3-6, the tube liner in accordance with the present invention will be described with respect to an auger liner 30. The auger liner 30 comprises an auger liner body 32 and an auger liner seam assembly 34. The auger liner body 32 is cylindrical in shape and has a gap 42 extending along its length. The gap 42 is defined by longitudinal edges 40 of the auger liner body 32 (FIGS. 7 and 8). The auger liner body 32 is constructed of an ultra high molecular weight polyethylene (UHMW polyethylene) having the general characteristics shown in Table 1 below.

TABLE 1

| UV Stabilized UHMW-PE | | | |
|---|---|---|---|
| Physical Properties | Metric | English | Comments |
| Specific Gravity | 0.93 g/cc | 0.0336 lb/in$^3$ | ASTM D792 |
| Water Absorption | Max 0.01% | Max 0.01% | Immersion, 24 hr; ASTM D570(2) |
| Water Absorption at Saturation | Max 0.01% | Max 0.01% | Immersion; ASTM D570(2) |
| Mechanical Properties | | | |
| Hardness, Shore D | 66 | 66 | ASTM D2240 |
| Tensile Strength, Ultimate | 40 MPa | 5800 psi | ASTM D638 |
| Elongation at Break | 300% | 300% | ASTM D638 |
| Tensile Modulus | 0.689 GPa | 100 ksi | ASTM D638 |
| Flexural Modulus | 0.758 GPa | 110 ksi | ASTM D790 |
| Flexural Yield Strength | 24.1 MPa | 3500 psi | ASTM D790 |
| Compressive Strength | 20.7 MPa | 3000 psi | 10% Def., 73° F.; ASTM D695 |
| Compressive Modulus | 0.552 GPa | 80 ksi | ASTM D695 |
| Shear Strength | 33.1 MPa | 4800 psi | ASTM D732 |
| Coefficient of Friction | 0.12 | 0.12 | Dry vs. Steel; QTM55007 |
| Limiting Pressure Velocity | 0.0701 MPa-m/sec | 2000 psi-ft/min | 4:1 safety factor; QTM 55007 |
| Izod Impact, Notched | NB | NB | ASTM D256 Type A |
| Electrical Properties | | | |
| Surface Resistivity per Square | Min 1e+015 ohm | Min 1e+015 ohm | ASTM D257 |
| Dielectric Constant | 2.3 | 2.3 | (1 MHz); ASTM D150 |
| Dielectric Strength | 90.6 kV/mm | 2300 V/mil | Short Term; ASTM D149 |
| Dissipation Factor | 0.0005 | 0.0005 | (1 MHz); ASTM D150 |
| Thermal Properties | | | |
| CTE, longitudinal 68° F. | 360 μm/m-° C. | 200 μin/in-° F. | (−40° F. to 300° F.); ASTM E831 |
| Thermal Conductivity | 0.409 W/m-K | 2.84 BTU-in/hr-f$^2$-° F. | |
| Melting Point | 135° C. | 275° F. | Crystalline, Peak; ASTM D3418 |
| Maximum Service Temperature, Air | 82.2° C. | 180° F. | Long Term |
| Deflection Temperature at 1.8 MPa (264 psi) | 46.7° C. | 116° F. | ASTM D648 |
| Flammability, UL94 (Estimated Rating) | HB | HB | 1/8 inch |

TABLE 1-continued

UV Stabilized UHMW-PE

| Physical Properties | Metric | English | Comments |
|---|---|---|---|
| Qualitative Processing Properties | | | |
| Compliance - FDA | Not Compliant | | |
| Machinability | 3 | | 1-10, 1 = Easier to Machine |
| Service in Alcohols | Acceptable | | |
| Service in Aliphatic Hydrocarbons | Acceptable | | |
| Service in Aromatic Hydrocarbons | Unacceptable | | |
| Service in Chlorinated Solvents | Acceptable | | |
| Service in Ethers | Limited | | |
| Service in Ketones | Limited | | |
| Service in Strong Acids | Limited | | |
| Service in Strong Alkalies | Acceptable | | |
| Service in Sunlight | Acceptable | | |
| Service in Weak Acids | Acceptable | | |
| Service in Weak Alkalies | Acceptable | | |

While the above described UHMW polyethylene is preferred for the auger liner 30, a person of ordinary skill in the art will appreciate that a variety of other flexible materials may be used for the auger liner 30 without departing from the present invention.

The auger liner seam assembly 34 is best seen in FIGS. 7, 8, 9, and 10. The auger liner seam assembly 34 is positioned in the gap 42 between the longitudinal edges 40 of the auger liner body 32 and comprises an inside plate 44 and an outside plate 46. The inside plate 44 and the outside plate 46 engage the auger liner body 32 adjacent the longitudinal edges 40. The inside plate 44 and the outside plate 46 are connected together in a spaced relationship by means of pairs of standoffs 48. Crush washers 50 loosely surround each standoff 48 and essentially fill the space between the inside plate 44 and the outside plate 46 around the standoffs 48.

Figure 9:
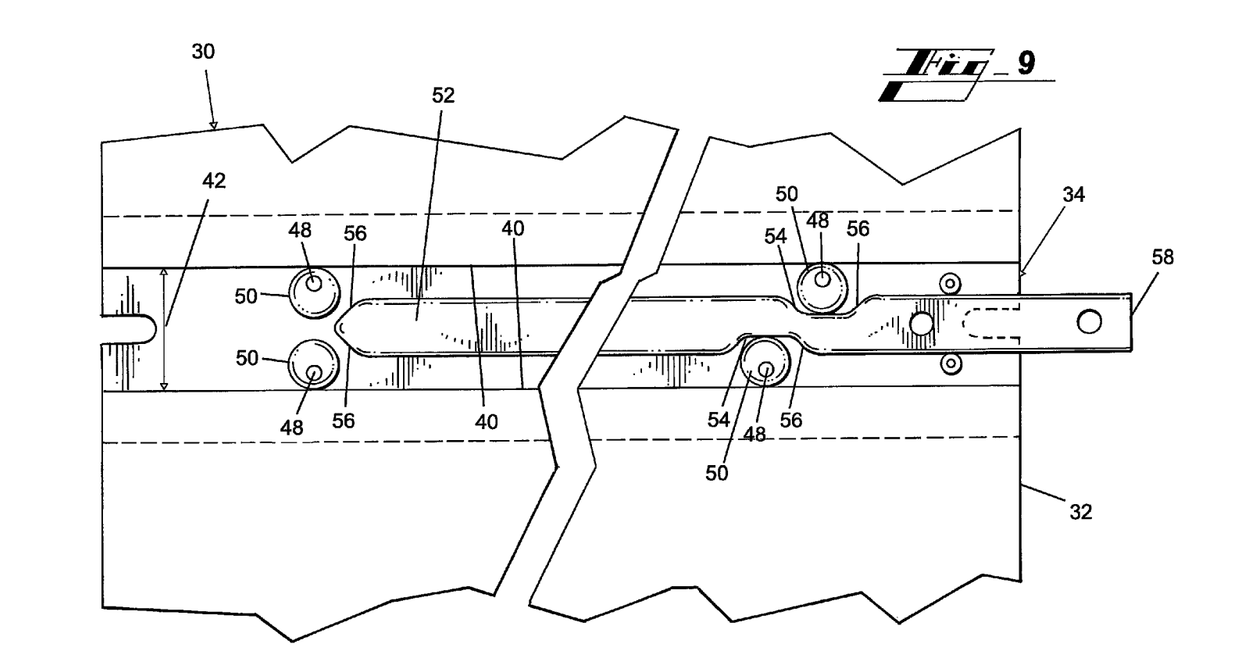
FIG. 9 is a side elevation view of the seam assembly of the auger liner in accordance with the present invention with the outside plate of the seam removed for clarity and the seam assembly in its load configuration.
Figure 10:
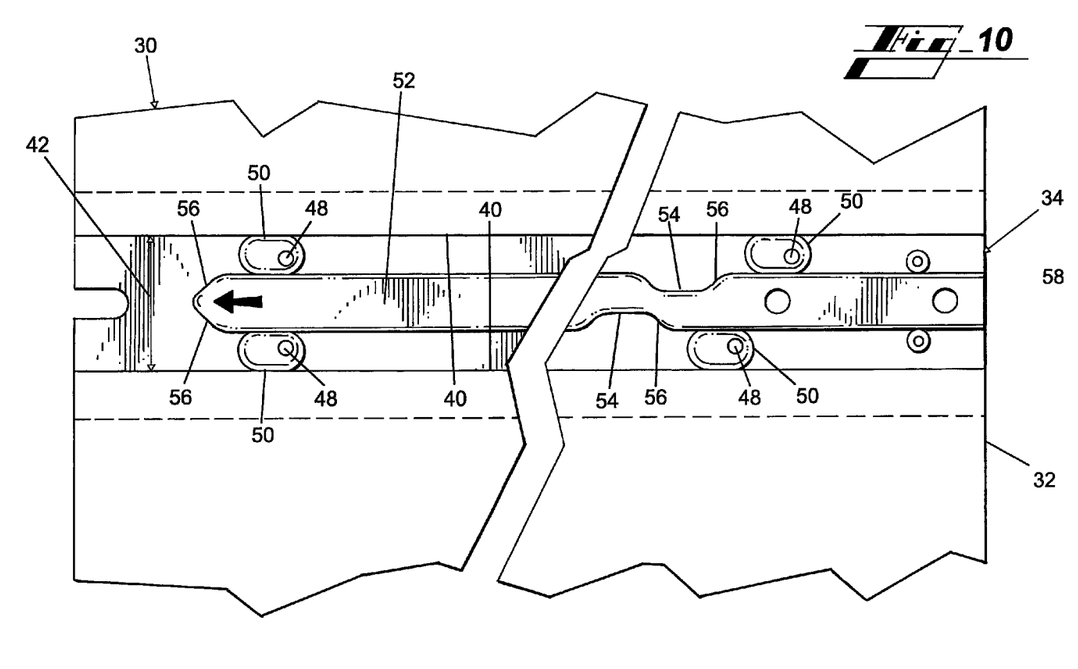
FIG. 10 is a side elevation view of the seam assembly of the auger liner in accordance with the present invention with the outside plate of the seam removed for clarity and the seam assembly in its final configuration.

As is best shown in FIGS. 9 and 10, an elongated expansion bar 52 is positioned between the pairs of standoffs 48. The expansion bar 52 has a series of notches 54 with camming sides 56 that are spaced along the length of the expansion bar 52 to match the longitudinal positions of the standoffs 48 and crush washers 50. When the expansion bar 52 is in its loading position, as shown in FIG. 9, the pairs of standoffs 48 with crush washers 50 align with the notches 54 in the expansion bar 52. Further, when the expansion bar 52 is in its loading position, as shown in FIG. 9, a drive end 58 of the expansion bar 52 extends longitudinally beyond end 35 of the auger liner seam assembly 34. In the loading position, shown in FIG. 9, the crush washers 50 are essentially cylindrical in shape and engage the longitudinal edges 40 of the gap 42 of the auger liner body 32 on one side and the notches 54 of the expansion bar 52 on the other side.

Turning to FIG. 10, the expansion bar 52 is shown in the final engaged position. Particularly, the expansion bar 52 has been driven (right to left in FIG. 10) into the auger liner seam assembly 34 so that the notches 54 no longer align with the pairs of standoffs 48 and crush washers 50. In the process of driving the expansion bar 52 into the auger liner seam assembly 34, the camming sides 56 of the notches 54 force the crush washers 50 outwardly against the longitudinal edges 40 of the auger liner body 32 to expand the diameter of the auger liner 30 against the inside wall 36 of the auger tube 12. Once the auger liner 30 is tightly forced against the inside wall 36 of the auger tube 12, further advance (right to left in FIG. 10) of the expansion bar 52 into the auger liner seam assembly 34, causes the camming action of the camming sides 56 to begin crushing the crush washers 50 into a flattened shape as shown in FIG. 10. The force required to crush the crush washers 50 provides a means of assuring a tight seal of the auger liner 30 against the inside wall 36 of the auger tube 12. Moreover, because a number of pairs of standoffs 48 with crush washers 50 are spaced along the length of the auger liner 30, the crush washers can provide for local variations in the diameter of the auger tube 12 and thereby ensure a tight fit of the auger liner 30 along the length of the auger tube 12.

Figure 11:
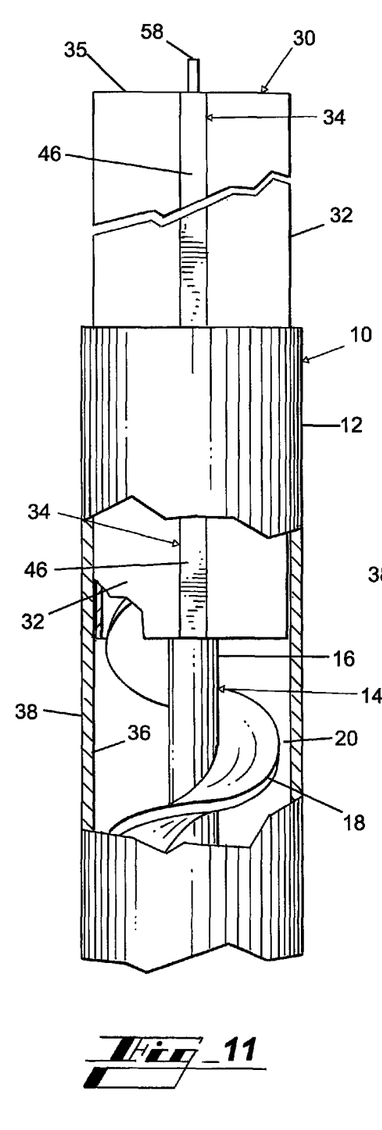
FIG. 11 is a side elevation view of the auger with the auger liner partially inserted into the auger tube, with cutaway detail, in accordance with the present invention.

FIGS. 11-14 illustrate a sequence of steps for repairing a damaged auger tube 12. In FIG. 11, the auger liner 30 is partially inserted into the auger tube 12. As shown in FIG. 11, the auger screw 14 remains in place, and the auger liner 30 is inserted into the clearance 20 between the outside diameter of the auger flights 18 and the inside wall 36 of the auger tube 12. Consequently, as previously noted, there is no need to move the auger screw 14 in order to install the auger liner 30 of the present invention. Also in FIG. 11, the drive end 58 of the expansion bar 52 is in its loading position extending beyond the end 35 of the auger liner seam assembly 34.

Figure 12:
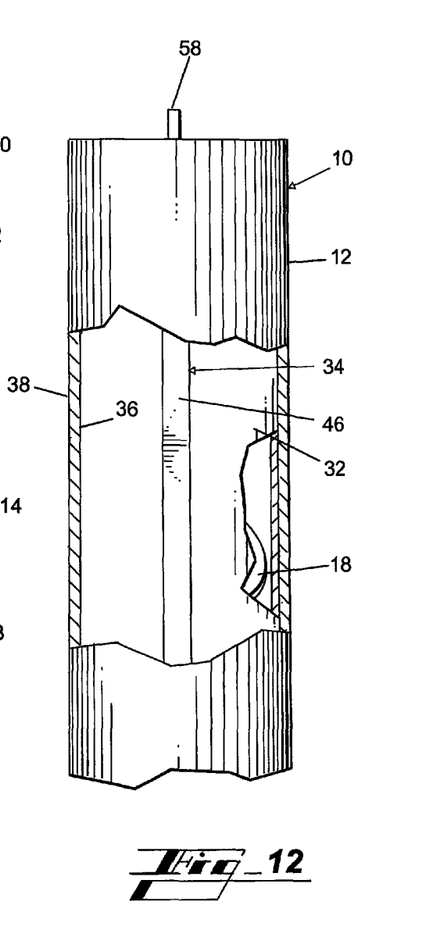
FIG. 12 is a side elevation view of the auger with the auger liner fully inserted into the auger tube and with the seam assembly in its load configuration, with cutaway detail, in accordance with the present invention.

In FIG. 12, the auger liner 30 is fully inserted into the auger tube 12. The drive end 58 of the expansion bar 52, however, has not yet been driven into the auger liner seam assembly 34. Consequently, the auger liner 30 remains somewhat loosely positioned within the clearance 20 between the outside diameter of the auger flights 18 and the inside wall 36 of the auger tube 12.

Figure 13:
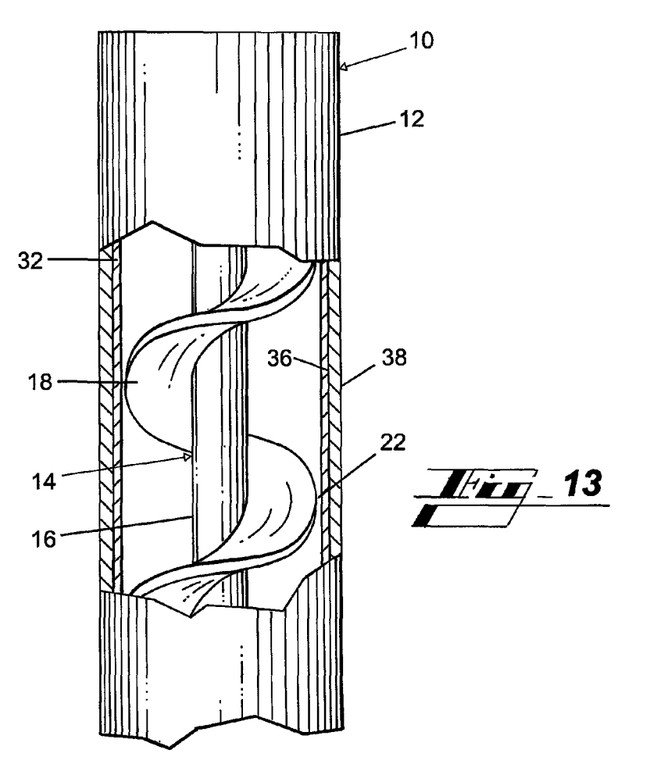
FIG. 13 is a side elevation view of the auger with the auger liner fully inserted into the auger tube and with the seam assembly in its final configuration, with cutaway detail, in accordance with the present invention.
Figure 14:
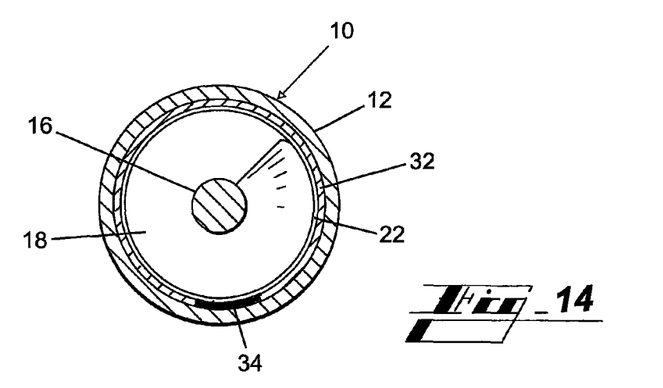
FIG. 14 is an end view of the auger with the auger liner fully inserted into the auger tube and with the seam assembly in its final configuration in accordance with the present invention.

As shown in FIG. 13, the expansion bar 52 has been fully driven into the auger liner seam assembly 34. Consequently, the auger liner 30 is forced against the inside wall 36 of the auger tube 12 to create a seal between the auger liner 30 and the inside wall 36 of the auger tube 12. Once the expansion bar 52 has been fully driven into the auger liner seam assembly 34 and the auger liner is sealed against the inside wall 36 of the auger tube 12, a clearance 22 exists between the outside diameter of the flights 18 and the auger liner 30.

While this invention has been described with reference to preferred embodiments thereof, it is to be understood that variations and modifications can be affected within the spirit and scope of the invention as described herein and as described in the appended claims. Particularly, while the tube liner has been described with respect to a round auger tube, a person of ordinary skill in the art will appreciate that the tube liner of the present invention could be used in connection with a pneumatic conveyor tube having a cross-sectional shape that is square or of any other regular geometric shape.

We claim:
1. A tube liner for a tube comprising:
 a. an elongated body with an elongated longitudinally extending gap with a length and having parallel longitudinal edges extending along the length of the gap; and
 b. an elongated expandable seam assembly positioned in the gap and engaging the parallel longitudinal edges of the gap,
 wherein the expandable seam assembly has a first loading position in which the expandable seam assembly allows the gap to have a first dimension and a second final position in which the expandable seam assembly exerts a variable force on the parallel longitudinal edges of the gap along the length of the gap to expand the gap to a second dimension that accommodates local variations in the tube.

2. The tube liner of claim 1, wherein the expandable seam assembly in the second final position exerts a force against the parallel longitudinal edges of the gap along the length of the elongated body.

3. The tube liner claim 2, wherein the seam assembly comprises:
 a. an inside plate and outside plate connected to each other in a spaced apart relationship by means of transversely spaced standoffs surrounded by crush washers; and
 b. an elongated expansion bar positioned between the transversely spaced standoffs and crush washers and having a series of longitudinal notches with camming sides,
 wherein, when the seam assembly is in the first loading position, the notches align with the standoffs and crush washers and wherein, when the seam assembly is in the second final position, the camming sides of the notches force the crush washers against the parallel longitudinal edges of the gap to expand the gap so that the expansion bar exerts variable forces on the parallel longitudinal edges of the gap as the crush washers are selectively deformed by the pressure exerted by the camming sides of the notches of the expansion bar.

4. A method of repairing an auger having an auger tube with an inside wall, having an auger screw with an auger shaft and attached auger flights, and having a clearance between the auger flights and the inside wall of the auger tube, the method comprising steps of:
 a. inserting a cylindrical auger liner into the clearance between the auger flights and the inside wall of the auger tube without removing the auger screw; and
 b. expanding the cylindrical auger liner to seal the auger liner against the inside wall of the auger tube, wherein the auger liner comprises:
  i. a cylindrical body with an elongated longitudinally extending gap with a length and having parallel longitudinal edges extending along the length of the gap; and
  ii. an elongated expandable seam assembly positioned in the gap and engaging the parallel longitudinal edges of the gap, and
 wherein the expandable seam assembly has a first loading position in which the expandable seam assembly allows the gap to have a first dimension and a second final position in which the expandable seam assembly exerts a variable force on the parallel longitudinal edges of the gap along the length of the gap to expand the gap to a second dimension that accommodates local variations in the auger tube.

5. The method of claim 4, wherein the seam assembly comprises:
 a. an inside plate and outside plate connected to each other in a spaced apart relationship by means of transversely spaced standoffs surrounded by crush washers; and
 b. an elongated expansion bar positioned between the transversely spaced standoffs and crush washers and having a series of longitudinally notches with camming sides,
 wherein, when the seam assembly is in the first loading position, the notches align with the standoffs and crush washers and wherein, when the seam assembly is in the second final position, the camming sides of the notches force the crush washers against the parallel longitudinal edges of the gap to expand the gap so that the expansion bar exerts variable forces on the parallel longitudinal edges of the gap as the crush washers are selectively deformed by the pressure exerted by the camming sides of the notches of the expansion bar.

6. A method of repairing a pneumatic conveyor tube with an inside wall, the method comprising steps of:
 a. inserting an elongated pneumatic conveyor liner into the pneumatic conveyor tube; and
 b. expanding the elongated pneumatic conveyor liner to seal the pneumatic conveyor liner against the inside wall of the pneumatic conveyor tube, and wherein the pneumatic conveyor liner comprises:
  i. an elongated body with an elongated longitudinally extending gap with a length and having parallel longitudinal edges extending along the length of the gap; and
  ii. an elongated expandable seam assembly positioned in the gap and engaging the parallel longitudinal edges of the gap,
 wherein the expandable seam assembly has a first loading position in which the expandable seam assembly allows the gap to have a first dimension and a second final position in which the expandable seam assembly exerts a variable force on the parallel longitudinal edges of the gap along the length of the gap to expand the gap to a second dimension that accommodates local variations in the pneumatic conveyor tube.

7. The method of claim 6, wherein the seam assembly comprises:
 a. an inside plate and outside plate connected to each other in a spaced apart relationship by means of transversely spaced standoffs surrounded by crush washers; and
 b. an elongated expansion bar positioned between the transversely spaced standoffs and crush washers and having a series of longitudinal notches with camming sides,
 wherein when the seam assembly is in the first loading position, the notches align with the standoffs and crush washers and wherein when the seam assembly is in the second final position, the camming sides of the notches force the crush washers against the parallel longitudinal edges of the gap to expand the gap so that the expansion bar exerts variable forces on the parallel longitudinal edges of the gap as the crush washers are selectively deformed by the pressure exerted by the camming sides of the notches of the expansion bar.

8. A tube liner comprising:
 a. an elongated body with an elongated longitudinally extending gap having longitudinal edges; and
 b. an elongated expandable seam assembly positioned in the gap and engaging the longitudinal edges of the gap,
 wherein the expandable seam assembly has a first loading position in which the expandable seam assembly allows the gap to have a first dimension and a second final position in which the expandable seam assembly exerts a force on the longitudinal edges of the gap to expand the gap to a second dimension, wherein the expandable seam assembly in the second final position exerts a force against the longitudinal edges of the gap along the length of the auger liner body, wherein the expandable seam assembly comprises:

a. an inside plate and an outside plate connected to each other in a spaced apart relationship by means of transversely spaced standoffs surrounded by crush washers; and b. an elongated expansion bar positioned between the transversely spaced standoffs and crush washers and having a series of longitudinally notches with camming sides, wherein, when the seam assembly is in the first loading position, the notches align with the standoffs and crush washers, and wherein, when the seam assembly is in the second final position, the camming sides of the notches force the crush washers against the longitudinal edges of the gap to expand the gap so that the expansion bar exerts variable forces on the longitudinal edges of the gap as the crush washers are selectively deformed by the pressure exerted by the camming sides of the notches of the expansion bar.

9. A method of repairing an auger having an auger tube with an inside wall, having an auger screw with an auger shaft and attached auger flights, and having a clearance between the auger flights and the inside wall of the auger tube, the method comprising steps of:

a. inserting a cylindrical auger liner into the clearance between the auger flights and the inside wall of the auger tube without removing the auger screw; and b. expanding the cylindrical auger liner to seal the auger liner against the inside wall of the auger tube, wherein the auger liner comprises:

a. a cylindrical body with an elongated longitudinally extending gap having longitudinal edges; and b. an elongated expandable seam assembly positioned in the gap and engaging the longitudinal edges of the gap, wherein the expandable seam assembly has a first loading position in which the expandable seam assembly allows the gap to have a first dimension and a second final position in which the expandable seam assembly exerts a force on the longitudinal edges of the gap to expand the gap to a second dimension, wherein the expandable seam assembly in the second final position exerts a force against the longitudinal edges of the gap along the length of the auger liner, wherein the seam assembly comprises:

a. an inside plate and outside plate connected to each other in a spaced apart relationship by means of transversely spaced standoffs surrounded by crush washers; and b. an elongated expansion bar positioned between the transversely spaced standoffs and crush washers and having a series of longitudinally notches with camming sides, wherein, when the seam assembly is in the first loading position, the notches align with the standoffs and crush washers, and wherein, when the seam assembly is in the second final position, the camming sides of the notches force the crush washers against the longitudinal edges of the cylindrical body to expand the gap so that the expansion bar exerts variable forces on the longitudinal edges of the gap as the crush washers are selectively deformed by the pressure exerted by the camming sides of the notches of the expansion bar.

10. A method of repairing a pneumatic conveyor tube with an inside wall, the method comprising steps of:

a. inserting an elongated pneumatic conveyor liner into the pneumatic conveyor tube; and b. expanding the elongated pneumatic conveyor liner to seal the pneumatic conveyor liner against the inside wall of the pneumatic conveyor tube, wherein the pneumatic conveyor liner comprises:

a. an elongated body with an elongated longitudinally extending gap having longitudinal edges; and b. an elongated expandable seam assembly positioned in the gap and engaging the longitudinal edges of the gap, wherein the expandable seam assembly has a first loading position in which the expandable seam assembly allows the gap to have a first dimension and a second final position in which the expandable seam assembly exerts a force on the longitudinal edges of the gap to expand the gap to a second dimension, wherein the expandable seam assembly in the second final position exerts a force against the longitudinal edges of the gap along the length of the pneumatic conveyor liner, wherein the seam assembly comprises:

a. an inside plate and outside plate connected to each other in a spaced apart relationship by means of transversely spaced standoffs surrounded by crush washers; and b. an elongated expansion bar positioned between the transversely spaced standoffs and crush washers and having a series of longitudinally notches with camming sides, wherein when the seam assembly is in the first loading position, the notches align with the standoffs and crush washers, and wherein when the seam assembly is in the second final position, the camming sides of the notches force the crush washers against the longitudinal edges of the gap to expand the gap so that the expansion bar exerts variable forces on the longitudinal edges of the gap as the crush washers are selectively deformed by the pressure exerted by the camming sides of the notches of the expansion bar.

\* \* \* \* \*